May 23, 1961  H. OTZMANN, JR  2,985,336
INSTRUMENT CASING ASSEMBLY
Filed May 6, 1955
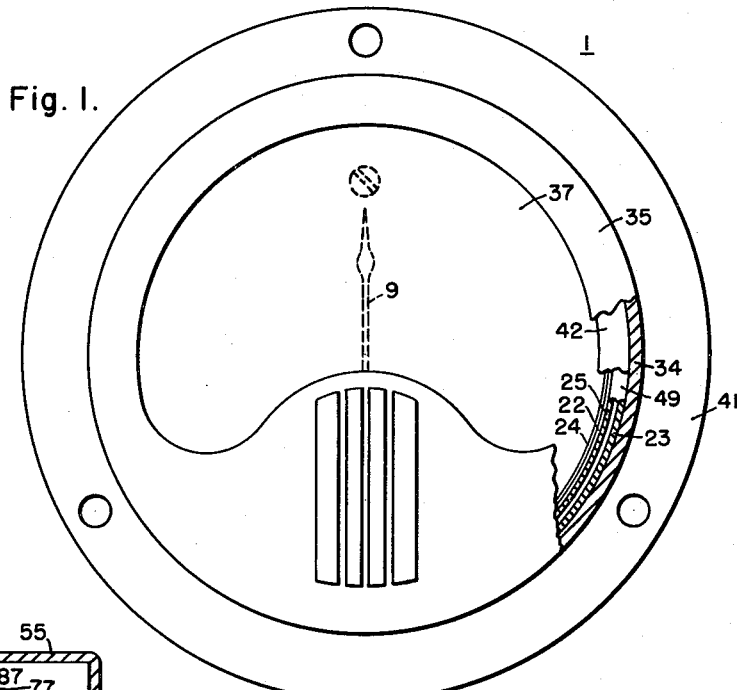
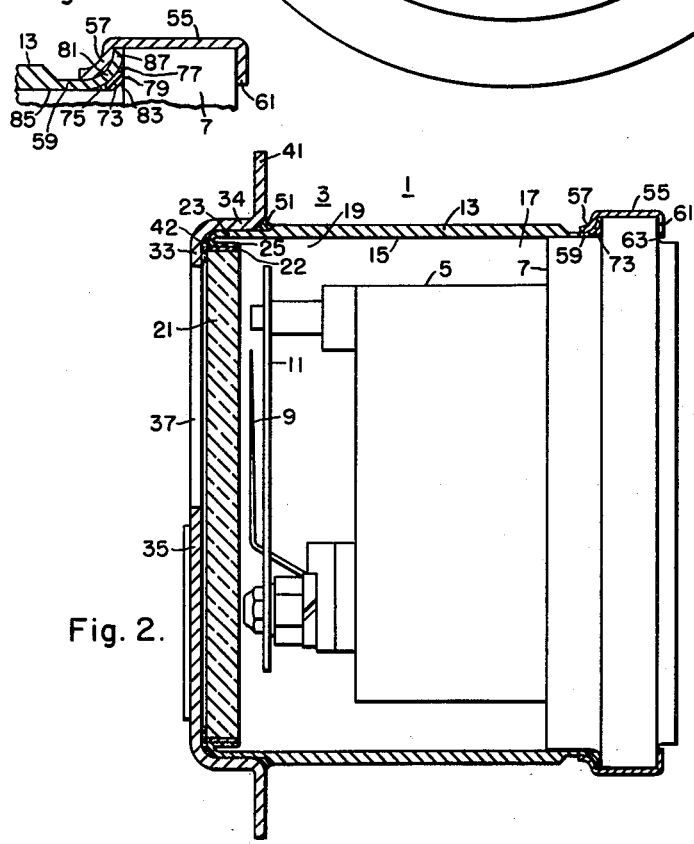
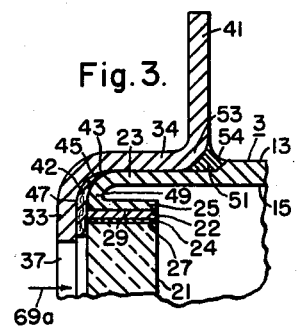
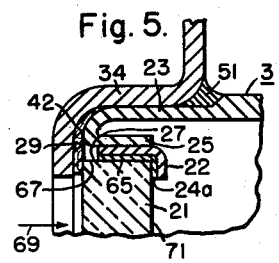
INVENTOR
Henry Otzmann, Jr.
BY
ATTORNEY

United States Patent Office 2,985,336
Patented May 23, 1961

2,985,336

INSTRUMENT CASING ASSEMBLY

Henry Otzmann, Jr., Roselle Park, N.J., assignor to Westinghouse Electric Corporation, East Pittsburgh, Pa., a corporation of Pennsylvania Filed May 6, 1955, Ser. No. 506,440

4 Claims. (Cl. 220—82)

This invention relates to instrument casing assemblies and has particular relation to a method of assembling an instrument casing assembly.

Electrical instruments have previously been provided which include a casing assembly adapted to receive an instrument mechanism. The casing assembly includes a casing having an open end for providing an observation area for viewing a portion of the instrument mechanism. A transparent plate is secured to the casing to cover the open end to permit observation of the instrument mechanism. In order to protect the mechanism against damage caused by the entry of foreign matter into the casing, it is desirable to provide a very effective seal between the casing and the transparent plate.

According to the present invention, an instrument is provided which includes a casing assembly having a joint formed by a portion of a casing, a transparent plate and a suitable sealing material positioned therebetween which is effectively sealed while pressure is applied to the joint. The sealing material is preferably in the form of a solid heat-meltable material, such as solder, having a melting point lower than associated parts of the instrument. Pressure is applied to the joint, such that the joint is compressed as the solid material is heated to a fluid condition to provide an effective sealed joint upon the subsequent hardening of the fluid material.

Sealing materials of the type above described, as well as the casing and plate, are ordinarily subject to expansion and contraction in response to temperature variations. If the transparent plate is formed of a frangible material such as glass, repeated cycles of such expansion and contraction may eventually cause breakage of the plate. The invention further provides an instrument including a casing assembly having a sealed joint formed in such a manner so as to permit expansion and contraction of the joint in response to variations in temperature.

According to a preferred embodiment of the invention, pressure is continuously applied to the joint by establishing a press fit condition between certain parts of the casing assembly. To this end, the casing assembly includes a casing having a flexible side wall with an open end proportioned to receive the transparent plate with clearance between the plate and the side wall. The solid heat-meltable material is positioned between the casing side wall and the plate to engage the side wall and the plate. A suitable cover is provided having an opening proportioned to snugly receive the casing to thereby provide a flexed condition of the flexible side wall effective to bias a portion of the side wall into engagement with the solid meltable material.

The joint thus formed may be heated in any suitable manner to provide a fluid condition of the material. As the solid material is melted, the joint is compressed by flexure of the flexible side wall within the elastic limit thereof to thereby provide a very effective sealed joint upon subsequent hardening of the fluid material. The invention further provides that the entire casing assembly be subjected to heat to effect the simultaneous sealing of other joints of the casing assembly.

The casing assembly is adapted to be secured to a suitable base to surround an instrument movement which is carried by the base. For this purpose a suitable sealing ring is positioned to surround the casing assembly and the base in engagement therewith.

According to a further aspect of the invention a sealed instrument is provided including a deformable but noncompressible gasket which is maintained in a deformed condition between the base and the casing assembly when secured together. The base and casing assembly are proportioned so as to provide tight engagement between surfaces of the base and casing assembly at spaced areas even in the event of failure of the gasket.

Transparent observation plates employed in instruments are generally formed of a frangible material such as glass. Plates of such construction are subject to frequent breakage thereby necessitating frequent replacement thereof. The invention further provides an instrument which includes a frangible plate secured to a casing in such a manner as to minimize the possibility of breakage thereof.

It is, therefore, an object of the invention to provide an improved casing assembly for an electrical instrument.

It is another object of the invention to provide an improved method of sealing fitted parts of an instrument casing assembly.

It is a further object of the invention to provide an instrument casing assembly formed such that continuous pressure is applied to a sealed joint of the assembly so as to permit expansion and contraction of the joint in response to variations in temperature.

It is a still further object of the invention to provide an instrument casing assembly including a casing having an annular flexible side wall with an annular flexible ring spaced from and surrounded by the side wall in engagement with sealing material positioned between the ring and a transparent frangible plate.

It is still another object of the invention to provide a method of sealing a casing and a transparent plate of an instrument casing assembly wherein pressure and heat are simultaneously applied to a joint formed by the casing, the plate and a solid heat-meltable material positioned therebetween.

It is still another object of the invention to provide an instrument including a casing engaging a supporting base with means for maintaining tight engagement between the casing and base in the event of failure of a deformable sealing gasket positioned between the casing and base in a deformed condition.

It is a further object of the invention to provide an instrument casing assembly including a frangible transparent plate constructed and mounted so as to minimize the possibility of breakage of the plate.

Other objects of the invention will be apparent from the following description taken in conjunction with the accompanying drawings, in which:

Figure 1 is a view in front elevation with parts broken away of an instrument embodying the invention;

Fig. 2 is a view in side elevation of the instrument of Fig. 1 with parts shown in section;

Fig. 3 is an enlarged view of a portion of the instrument of Fig. 2;

Fig. 4 is an enlarged view in section of another portion of the instrument of Fig. 2; and Fig. 5 is a view similar to Fig. 3 illustrating a further embodiment of the invention.

Referring to the drawings, there is shown an assembly represented generally by the numeral 1 embodying the teachings of the invention. In the specific embodiment illustrated, the assembly 1 is in the form of an electrical instrument although the invention may be applied to a number of other devices.

The instrument 1 is shown as including a casing assembly 3 adapted to receive an instrument movement 5 which is secured to a suitable base 7. The movement 5 may be of any suitable type. As illustrated, the movement 5 is of the indicating type including an indicating pointer 9 adapted to traverse a suitably calibrated scale 11 when the movement 5 is energized.

The casing assembly 3 includes a casing 13 which is illustrated in the form of a tubular shaped member having an annular side wall 15 with a pair of opposing open ends 17 and 19. The casing 13 may be formed of any suitable material. Preferably, the casing 13 is formed of a metallic material, such as steel, to which conventional solder materials readily adhere. The movement 5 is adapted to be positioned within the casing 13 through the open end 17 with the pointer 9 and the scale 11 adjacent the open end 19 to permit inspection of the pointer 9 and the scale 11. The casing 13 is adapted to receive a suitable transparent plate 21 formed of any suitable transparent material such as glass. The plate 21 is received by the casing 13 through the open end 19 for concentric mounting relative to the casing 13. The plate 21 is preferably provided with a coating 24 of a suitable metallic material which engages the peripheral surface 27 of the plate 21 for a purpose appearing hereinafter.

In the past a number of difficulties have been encountered in properly securing a transparent observation plate to a supporting casing. In order to prevent entry of foreign matter into the casing which may adversely affect the instrument movement mounted therein, it is necessary to provide a very effective seal between the casing and the plate. Such a seal should be formed so as to be capable of withstanding severe physical shocks as well as substantial variations in temperature to which the instrument may be subjected in practice.

According to the present invention an instrument of improved construction is provided by sealing the plate 21 to the casing 13 while pressure is applied to a joint formed by a portion of the casing 13, the plate 21 and a suitable sealing material 22 positioned therebetween. Such arrangement provides an instrument casing assembly having a very effective seal between fitted parts of the assembly. However, the construction of the assembly may be further improved according to another aspect of the invention.

In order to prevent damage to the plate 21 and to prevent failure of the seal by repeated cycles of expansion and contraction of the sealing material 22, the casing 13 and the plate 21 caused by variations in temperature, the invention further provides an instrument casing assembly including a sealed joint formed so as to permit expansion and contraction of the joint in response to variations in temperature. Preferably, the sealed joint is subjected to continuous pressure which may be applied to the joint in any suitable manner.

In the specific embodiment of the invention illustrated, forces are applied to the casing 13 uniformly about the axis of the casing in radial directions to bias a flexible portion of the casing 13 into engagement with the sealing material 22. To this end, pressure is applied to the joint by providing a press fit condition between portions of the casing assembly 3.

For this purpose, the casing 13 includes a thin side wall portion 23 adjacent the open end 19 which is of flexible construction to permit flexure of the portion 23 in directions radially of the casing 13 in response to the application of small forces to the portion 23 in the radial directions. Good results have been obtained by providing a portion 23 having a thickness dimension of approximately .01 inch. In order to permit the formation of an expansible and contractable joint the portion 23 is reversely bent upon itself to provide a flexible annular ring 25 which is spaced from and surrounded by the side wall 15, as best shown in Fig. 3.

As illustrated in Fig. 2, the plate 21 is proportioned for positioning within the ring 25 with clearance between the coating 24 of the peripheral surface 27 of the plate 21 and the inner surface 29 of the ring 25. The material 22 is positioned between the coating 24 and the surface 29 to engage the coating 24 and the surface 29 for the purpose of mounting the plate 21 within the casing 13. The sealing material 22 may be in any suitable form. Preferably, the material 22 is in the form of a solid heat-meltable material, such as a conventional solder material having a melting point which is substantially lower than the melting point of associated parts of the instrument 3.

In order to provide a flexed condition of the flexible portion 23 to bias the ring 25 radially of the casing 13 into engagement with the material 22, the casing assembly 3 includes a suitable cover 33 which is preferably formed of a metallic material, such as steel. The cover 33 includes a side wall 34 with a transverse end wall 35 and an opposing open end for receiving the casing 13. The end wall 35 is provided with an opening 37 for permitting observation of the pointer 9 and the scale 11 through the transparent plate 21 when the casing 13 is operatively associated with the cover 33. The cover 33 includes further a transverse flange 41 adjacent the open end of the cover 33.

In Fig. 2 the casing 13 is shown positioned within the cover 33 with the plate 21 adjacent the opening 37 of the end wall 35. The cover 33 is proportioned to snugly receive the casing 13 with the side wall 34 and the wall portion 23 in engagement to provide a press fit condition of the cover and casing. For this purpose the outer diameter of the thin wall portion 23 of the casing 13 when in an unflexed condition is slightly greater than the inner diameter of the side wall 34 of the cover 33.

With this arrangement the flexible wall portion 23 is flexed radially of the casing 13 uniformly about the axis of the casing to thereby bias the flexible ring 25 into engagement with the sealing material 22. Consequently, the material 22 is effectively compressed between the ring 25 and the plate 21. In order to maintain the material 22 between the plate 21 and the ring 25 during the sealing operation, a suitable retaining member in the form of a washer 42 is positioned between the end wall 35 and the casing 13 to engage the material 22. The washer 42 is preferably formed of a heat-resistant material such as asbestos paper. The operations required to assemble the casing assembly 3 will now be described.

In order to permit effective adhesion of the sealing material 22 to the plate 21, the plate 21 is preferably metallized to provide a metallic coating 24 for the peripheral surface 27 of the plate 21. The coating 24 may be applied by any suitable metallizing operation and is shown in Fig. 3 as applied over the entire surface 27. The plate 21 may also be heat-treated in any suitable manner to improve the strength and flexibility characteristics thereof. Suitable fluxing material is then applied to the coating 24 of the periphery 27 of the plate 21 and to the inner surface 29 of the ring 25. Fluxing material is also applied to the inner surface 43 of the wall 34 of the cover 33 including a portion 53 of the cover 33 which connects the wall 34 and the flange 41, and to the outer surface 45 of the wall portion 23 of the casing 13 including a surface 54 of the portion 23 which is spaced from the connecting portion 53. The material 22 is next applied to the plate 21.

To this end, the material 22 is formed in the configuration of a ring proportioned to surround the plate 21 to snugly engage the coating 24 of the peripheral surface 27 of the plate 21. The invention has been successfully practiced with a ring of the material 22 having a thickness dimension of approximately .012 inch. After the ring of material 22 is positioned about the plate 21, this assembly is then pressed into the flexible ring 25 to have the material 22 in engagement with the inner surface 29 of the ring 25. The washer 42 may then be positioned within the cover 33 to engage the inner surface 47 of the end wall 35.

The assembly comprising the casing 13, the plate 21 and the material 22 is now positioned within the cover 33 through the open end thereof to have the plate 21 adjacent the opening 37 of the end wall 35. The assembly is further positioned so that the washer 42 engages the material 22. As previously described, the cover 33 is proportioned to snugly receive the casing 13 to thereby flex the flexible wall portion 23 uniformly about the axis of the casing 13 to bias the ring 25 into engagement with the material 22.

In order to seal the casing 13 to the cover 33 a suitable sealing material 51 which is preferably similar to the material 22 is positioned to surround the casing 13 within an annular gap defined by the connecting portion 53 of the cover 33 and the surface 54 of the portion 23 of the casing 13. The entire assembly including the cover 33 and the casing 13 with the plate 21 positioned therein is now prepared for the heating operation constituting the final step of assembly.

In order to finally assemble the assembly 3, the assembly 3 is subjected to uniform heating sufficient to provide a fluid condition of the materials 22 and 51. This may be accomplished in any suitable manner such as by placing the assembly 3 within an induction heating unit (not shown). The assembly 3 is preferably positioned to have the open end 17 of the casing 13 above the end wall 35 of the cover 33 to maintain the material 22 in an operative position. With this arrangement the heat-meltable materials 22 and 51 are simultaneously brought to a fluid condition when subjected to heat. As the material 22 is melted, the flexible ring 25 of the casing 13 is flexed radially of the casing to maintain engagement with the fluid material 22 thereby causing the material to entirely fill the space between the coating 24 of the surface 27 of the plate 21 and the inner surface 29 of the ring 25. When the material 22 is sufficiently fluid the applied heat is removed with the result that the fluid material 22 subsequently hardens to provide an effective seal between the plate 21 and the ring 25. At the same time, the material 51 is melted and allowed to attain a solid state to provide an effective seal between the casing 13 and the cover 33.

The flexible wall portion 23 of the casing 13 and the cover 33 are proportioned such that the ring 25 is biased against the material 22 with a force sufficient so that upon the melting and subsequent hardening of the material 22 the ring 25 is still biased into engagement with the material 22 to a certain extent. Consequently, the sealed joint formed by the ring 25, the material 22 and the plate 21 is effectively maintained under compression subsequent to the formation of the seal. The ring 25 is sufficiently flexible to permit flexure thereof in radial directions in response to expansion and contraction of the material 22 and the plate 21 in radial directions caused by variations in temperature. This arrangement provides an expansible and contractable joint which is very effective in minimizing failure of the seal and breakage of the plate 21.

It is also observed that the material 51 serves to connect the cover 33 to the flexible portion 23 at an area which is spaced from the seal including the material 22 axially of the casing 13. Such arrangement provides a flexible mounting for the cover 33.

After assembly of the casing assembly 3 in the manner described, the sealed joint formed by the ring 25, the material 22 and the plate 21 may be subjected to suitable tests to determine the sufficiency of the joint. Such tests are conveniently performed prior to assembly of the casing assembly 3 to the base 7 by subjecting the assembly 3 to various physical shocks and temperature conditions.

The assembly 3 is secured to the base 7 as by a suitable sealing ring 55 which may include a portion 57 which is spun over to engage a flange 59 of the casing 13. The ring 55 also includes a flange 61 which engages a surface 63 of the base 7.

In order to provide an effective seal between the casing 13 and the base 7 the invention provides suitable sealing means positioned between the casing 13 and the base 7. As illustrated in Fig. 4, such sealing means is in the form of a ring-shaped gasket 73 positioned in an annular gap 75 defined by opposing surfaces 77 and 79 of the flange 59 of the casing 13 and the base 7 respectively. The surface 79 of the base 7 connects the side wall of the base and a flange of the base which extends transverse to the base side wall.

According to the invention the gasket 73 is formed of a deformable but non-compressible material such as silicone rubber. The gasket 73 is preferably formed to have a substantially rectangular shaped cross-sectional area when in a non-deformed condition. The gasket 73 may be formed in any suitable manner such as by stamping from sheet stock a gasket of the desired configuration. If desired, the gasket 73 may be formed by a molding operation to provide a gasket of the desired shape.

For the purpose of preventing the entry of foreign matter into the casing 13 from the end 17 of the casing the base 7 and the casing 13 are proportioned to engage the gasket 73 to maintain the gasket within the gap 75 in a deformed condition when secured together by means of the ring 55. The surfaces 77 and 79 are preferably curved at areas thereof which engage the gasket 73 to provide an effectively sealed path and to permit engagement of portions of the surfaces 77 and 79 which are spaced from the gasket.

To this end the surfaces 77 and 79 include respectively curved portions 81 and 83 with the curved portion 81 having a greater radius of curvature than the radius of curvature of the curved portion 83. Such construction not only permits the gasket 73 to be deformed between the surfaces 77 and 79 but also permits engagement between portions of the surfaces 77 and 79 which are spaced from the gasket 73 at areas indicated by the numerals 85 and 87.

The gasket 73 is maintained in the deformed condition by means of the sealing ring 55 which engages the flange 59 and the base 7. It is observed that with such construction tight engagement between the casing 13 and the base 7 at the spaced areas 85 and 87 is maintained even in the event of failure of the gasket 73. Such arrangement provides a very effective seal between the casing 13 and the base 7.

It is observed with reference to Fig. 3 that the material 22 connects the entire surface 27 of the plate 21 to the ring 25. If desired, the plate 21 may be connected to the casing 13 in the manner illustrated in Fig. 5 which is different from the manner of Fig. 3.

In the embodiment of Fig. 5 only a portion of the surface 27 of the plate 21 is connected to the casing 13. The remaining portion of the surface 27 is thereby mounted in a detached condition relative to the casing 13. It has been observed that such construction is effective to minimize breakage of the plate 21 and failure of the sealed joint formed by the plate 21, the material 22 and the ring 25 caused by the application of forces to the plate 21.

As illustrated in Fig. 5 a coating 24a of any suitable material to which sealing materials such as the material 22 readily adhere is applied only to a portion of the surface 27 of the plate 21. The coating 24a is shown as adhering to a portion 65 of the surface 27 with the portion 67 of the surface 27 being free of the coating 24a.

With such arrangement a conventional solder material, such as the material 22, which is applied to the plate 21 will adhere effectively only to the coating 24a. Consequently, with the plate 21 in an operative position as shown in Fig. 5, the material 22 is effective to secure the plate 21 to the casing 13 only by contacting the coating 24a and the ring 25. It is observed that since the portion 67 of the surface 27 is detached from the ring 25 the portion 67 is free for slight movement radially of the casing 13 relative to the ring 25.

The present invention is effective to minimize breakage of the plate 21 and failure of the sealed joint formed by the ring 25, the material 22 and the plate 21. If the plate 21 is properly heat treated it will possess a certain amount of flexibility. Consequently, if a force is applied to the plate 21 in the direction indicated by the arrow 69, the portion 67 of the surface 27 will move slightly in the direction away from the surface 29 of the ring 25 in response to flexure of the plate 21 in the direction of the arrow 69.

The possibility of breakage of the plate 21 is considerably less with the construction of Fig. 5 than with the construction of Fig. 3 wherein the entire surface 27 of the plate 21 is attached to the ring 25. In Fig. 3 radial movement of the surface 27 relative to the ring 25 is prevented with the result that flexure of the plate 21 in the direction of the arrow 69a may effect breakage of the plate 21 or failure of the seal between the plate 21 and the casing 13.

It is desirable that the plate 21 be positioned such that the portion 67 of the surface 27 is adjacent the side of the plate 21 to which forces may be applied. The plate 21 is shown in Fig. 5 in the position wherein the plate 21 most effectively withstands a force applied thereto in the direction of the arrow 69.

In order to assure a good seal between the plate 21 and the ring 25 the coating 24a is also applied to an annular portion of the surface 71 of the plate 21 which is adjacent the portion 65 of the surface 27. Excellent results have been obtained by employing a plate 21 having a thickness dimension of approximately .125 inch with a coating 24a applied over an annular portion 65 of the surface 27 which has a width dimension of approximately .095 inch. This leaves an annular portion 67 of the surface 27 free of the coating 24a which has a thickness dimension of approximately .03 inch.

If the plate 21 is constructed of a material to which sealing material, such as the material 22, normally adheres when in a sealing condition, then coatings for the surface 27, such as the coatings 24 and 24a may be omitted. In such a case the invention provides that the sealing material 22 be in direct engagement with the portion 65 of the surface 27, and that the portion 67 of the surface 27 be left free of the material 22.

Although the invention has been described with reference to certain specific embodiments thereof, numerous modifications falling within the spirit and scope of the invention are possible.

I claim as my invention:

1. In a casing assembly, a casing having an annular first side wall with a thin side wall portion of flexible construction, said side wall portion being reversely bent upon itself to provide a flexible annular ring spaced from and surrounded by the first side wall, a frangible transparent member having a peripheral surface positioned concentrically within the ring with radial clearance between the peripheral surface and the ring, sealing means positioned between the member and the ring to engage the peripheral surface and the ring for maintaining the member within the casing, and a cover of rigid construction having an annular second side wall with a transverse end wall and an opposing open end, said end wall having an opening, said casing being positioned within the cover from the open end with said side wall portion engaging said second side wall to have the member adjacent the opening, said cover and casing being proportioned to provide a radially flexed condition of said side wall portion within the elastic limit thereof to bias the flexible ring into engagement with the sealing means.

2. In a casing assembly, a casing having an annular flexible first side wall with an annular flexible ring spaced from and surrounded by the first side wall, a frangible transparent member having a peripheral surface positioned concentrically within the ring with radial clearance between the peripheral surface and the ring to provide an annular gap, a solid heat-meltable material positioned between the member and the ring to engage the peripheral surface and the ring for maintaining the member within the casing, and a retaining member of rigid construction having an annular second side wall, said retaining member surrounding the casing with said first and second side walls in engagement, said retaining member and said casing being proportioned to provide a radially flexed condition of said first side wall within the elastic limit thereof to bias the ring into engagement with the solid material.

3. In a casing assembly, a casing having an annular first side wall with a thin side wall portion of flexible construction, said thin side wall portion being reversely bent upon itself to provide a flexible annular ring spaced from and surrounded by the first side wall, a frangible transparent member having a peripheral surface positioned concentrically within the ring with radial clearance between the peripheral surface and the ring, a solid heat-meltable material positioned between the member and the ring to engage the peripheral surface and the ring for maintaining the transparent member within the casing, and a cover of rigid construction having an annular second side wall with a transverse end wall and an opposing open end, said end wall having an opening, said casing being positioned within the cover from the open end with said thin side wall portion engaging said second side wall to have the member adjacent the opening, said cover and casing being proportioned to provide a flexed condition of said thin side wall portion within the elastic limit thereof to bias the flexible ring into engagement with the solid material, and an additional solid heat-meltable material surrounding said casing for engaging said cover and said casing.

4. In a casing assembly, a casing having an annular first side wall of normal wall thickness with a thin side wall portion of flexible construction, said thin side wall portion being of lesser thickness than said normal thickness and reversely bent upon itself to provide a flexible annular ring spaced from and surrounded by the side wall, a frangible transparent member positioned concentrically within the ring, means engaging the casing and the transparent member to retain the transparent member within the ring, a cover of rigid construction having an annular second side wall, said casing being positioned within the cover with said thin side wall portion engaging said second side wall, and connecting means connecting the cover to the casing at an area spaced from the annular ring axially of the casing.

References Cited in the file of this patent

UNITED STATES PATENTS

| | | |
|---|---|---|
| 579,969 | Fellows | Apr. 6, 1897 |
| 1,192,538 | Leslie | July 25, 1916 |
| 1,209,925 | Adams | Dec. 26, 1916 |
| 1,306,809 | Graham | June 17, 1919 |
| 1,999,271 | Austin | Apr. 30, 1935 |
| 2,038,760 | Roselle | Apr. 28, 1936 |
| 2,085,277 | Smith | June 29, 1937 |
| 2,348,696 | Schabacker | May 9, 1944 |
| 2,401,231 | Crawford | May 28, 1946 |
| 2,413,689 | Clark et al. | Jan. 7, 1947 |
| 2,431,226 | Berkey et al. | Nov. 18, 1947 |
| 2,577,576 | Clickman et al. | Dec. 4, 1951 |
| 2,708,250 | Day | May 10, 1955 |
| 2,746,635 | Ammon | May 22, 1956 |